(12) United States Patent  
Ronan et al.

(10) Patent No.: US 10,030,539 B2  
(45) Date of Patent: Jul. 24, 2018

(54) GAS TURBINE ENGINE INNER CASE INCLUDING NON-SYMMETRICAL BLEED SLOTS

(71) Applicant: United Technologies Corporation, Hartford, CT (US)

(72) Inventors: Michael Ronan, East Hartford, CT (US); Daniel Carminati, Berlin, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 454 days.

(21) Appl. No.: 14/646,549

(22) PCT Filed: Mar. 5, 2013

(86) PCT No.: PCT/US2013/029078  
§ 371 (c)(1),  
(2) Date: May 21, 2015

(87) PCT Pub. No.: WO2014/098936  
PCT Pub. Date: Jun. 26, 2014

(65) Prior Publication Data  
US 2015/0292358 A1    Oct. 15, 2015

Related U.S. Application Data

(60) Provisional application No. 61/738,536, filed on Dec. 18, 2012.

(51) Int. Cl.  
*F01D 25/14* (2006.01)  
*F01D 25/24* (2006.01)  
(Continued)

(52) U.S. Cl.  
CPC ............. *F01D 25/14* (2013.01); *F01D 25/24* (2013.01); *F01D 25/26* (2013.01); *F02C 6/08* (2013.01);  
(Continued)

(58) Field of Classification Search  
CPC .......... F01D 25/14; F01D 25/26; F01D 25/24; F01D 27/009; F04D 29/522;  
(Continued)

(56) References Cited

U.S. PATENT DOCUMENTS

| 4,645,416 A | 2/1987 | Weiner |
| 4,826,397 A | 5/1989 | Shook et al. |

(Continued)

FOREIGN PATENT DOCUMENTS

| EP | 2055961 A1 | 5/2009 |
| JP | H02241904 A | 9/1990 |

OTHER PUBLICATIONS

Extended European Search Report for EP Application 13865842.2 dated Jul. 20, 2016.

(Continued)

*Primary Examiner* — Eldon Brockman  
(74) *Attorney, Agent, or Firm* — Carlson, Gaskey & Olds, P.C.

(57) ABSTRACT

A compressor of a gas turbine engine includes a plurality of rotors rotatable about a central longitudinal axis, a plurality of stators, and a circumferential inner case wall located outwardly of the plurality of rotors and the plurality of stators. The inner case wall includes a plurality of first slots located in a first section of the circumferential inner case wall and a plurality of second slots located in at least one second section of the circumferential inner case wall. A first area of each of the first slots is greater than a second area of each of the second slots. A circumferential manifold is (Continued)

located outwardly of the inner case wall including a port. At least one of the plurality of second slots is located proximate to the port.

18 Claims, 3 Drawing Sheets

(51) Int. Cl.
*F02C 6/08* (2006.01)
*F02C 9/18* (2006.01)
*F01D 25/26* (2006.01)
*F02C 7/18* (2006.01)
*F02K 3/04* (2006.01)
*F04D 29/52* (2006.01)

(52) U.S. Cl.
CPC ............... *F02C 7/18* (2013.01); *F02C 9/18* (2013.01); *F02K 3/04* (2013.01); *F04D 29/522* (2013.01)

(58) Field of Classification Search
CPC .. F04D 29/545; F02C 7/18; F02C 9/18; F02C 6/08; F02K 3/04
See application file for complete search history.

(56) References Cited

U.S. PATENT DOCUMENTS

| | | | |
|---|---|---|---|
| 5,152,666 A | 10/1992 | Stripinis et al. | |
| 5,203,162 A | 4/1993 | Burge | |
| 5,205,115 A | 4/1993 | Plemmons et al. | |
| 5,826,423 A | 10/1998 | Lockyer et al. | |
| 5,860,283 A | 1/1999 | Coleman et al. | |
| 7,788,931 B2* | 9/2010 | Tatebayashi | F01D 9/045 60/782 |
| 8,047,763 B2* | 11/2011 | Black | F01D 11/24 415/1 |
| 8,388,308 B2* | 3/2013 | Karafillis | F04D 29/522 415/145 |
| 2004/0033133 A1 | 2/2004 | Muny | |
| 2008/0112791 A1 | 5/2008 | Lee et al. | |
| 2009/0000307 A1* | 1/2009 | Tatebayashi | F01D 9/045 60/785 |
| 2009/0133403 A1 | 5/2009 | Som et al. | |
| 2009/0155056 A1 | 6/2009 | Brunet et al. | |
| 2009/0297335 A1* | 12/2009 | Karafillis | F04D 29/522 415/115 |
| 2010/0111679 A1* | 5/2010 | Black | F01D 11/24 415/177 |
| 2010/0275613 A1 | 11/2010 | Alasti et al. | |
| 2011/0072829 A1 | 3/2011 | Bil et al. | |

OTHER PUBLICATIONS

International Preliminary Report on Patentability for International Application No. PCT/US2013/029078 dated Jul. 2, 2015.
International Search Report and Written Opinion for International Application No. PCT/US2013/029078 dated Dec. 16, 2013.

* cited by examiner

GAS TURBINE ENGINE INNER CASE INCLUDING NON-SYMMETRICAL BLEED SLOTS

REFERENCE TO RELATED APPLICATION

This application claims priority to U.S. Provisional Application No. 61/738,536 filed Dec. 18, 2012.

BACKGROUND OF THE INVENTION

Bleed air from an axial flow compressor flows through axis-symmetric slots in an inner casing to a manifold. The bleed air in the manifold is directed to at least one of an aircraft environmental control system or wing-anti ice system, or elsewhere in the gas turbine engine for cooling. Flow extractions from the manifold at discrete locations can cause uneven pressure distribution and create a non-axis-symmetric bleed flow from the compressor. A non-axis-symmetric flow results in lower compressor stall margins than an axis-symmetric flow. Flow asymmetry can be reduced by decreasing the area of the bleed slots, but this can cause an increase in pressure losses.

SUMMARY OF THE INVENTION

A compressor of a gas turbine engine according to an exemplary embodiment of this disclosure, among other possible things includes a plurality of rotors rotatable about a central longitudinal axis, a plurality of stators, and a circumferential inner case wall located outwardly of the plurality of rotors and the plurality of stators. The inner case wall includes a plurality of first slots located in a first section of the circumferential inner case wall and a plurality of second slots located in at least one second section of the circumferential inner case wall. A first area of each of the first slots is greater than a second area of each of the second slots. A circumferential manifold is located outwardly of the inner case wall including a port. At least one of the plurality of second slots is located proximate to the port.

In a further embodiment of any of the foregoing compressors the compressor is a high pressure compressor.

In a further embodiment of any of the foregoing compressors the plurality of first slots and the plurality of second slots are located after a fourth stage rotor.

In a further embodiment of any of the foregoing compressors the second area of each of the second slots is substantially 90% of the first area of each of the first slots.

In a further embodiment of any of the foregoing compressors the manifold includes four mid-turbine frame/low pressure turbine ports that direct bleed air to a mid-turbine frame and a low pressure turbine.

In a further embodiment of any of the foregoing compressors the first slots are located proximate to the four mid-turbine frame/low pressure turbine ports.

In a further embodiment of any of the foregoing compressors the manifold includes a buffer port that directs bleed air to bearings.

In a further embodiment of any of the foregoing compressors the port is an environmental control system port that directs bleed air to an environmental control system.

In a further embodiment of any of the foregoing compressors includes two third slots. Each of the third slots have a third area smaller than the second area of each of the second slots, and the first section and the at least one second section meet at two locations, and each of third slots is located at one of the two locations.

In a further embodiment of any of the foregoing compressors the third area of each of the third slots is substantially 95% of each of the first area of each of the first slots.

In a further embodiment of any of the foregoing compressors the plurality of first slots, the plurality of second slots, and the two third slots are equally located about the central longitudinal axis.

In a further embodiment of any of the foregoing compressors at least one of the two third slots is located proximate to a buffer port.

In a further embodiment of any of the foregoing compressors the manifold includes four mid-turbine frame/low pressure turbine ports that direct bleed air to a mid-turbine frame and a low pressure turbine, and a buffer port that directs bleed air to bearings. The port is an environmental control system port that directs bleed air to an environmental control system. The environmental control system port has an area that is substantially four to substantially six times larger than an area of the four mid-turbine frame/low pressure turbine ports and an area of the buffer port.

In a further embodiment of any of the foregoing compressors the plurality of second slots are located proximate to the port.

A compressor of a gas turbine engine according to an exemplary embodiment of this disclosure, among other possible things includes a plurality of rotors rotatable about a central longitudinal axis, a plurality of stators, and a circumferential inner case wall located outwardly of the plurality of rotors and the plurality of stators. The inner case wall includes a plurality of first slots each having a first area and located in a first section of the circumferential inner case wall, a plurality of second slots each having a second area and located in at least one second section of the circumferential inner case wall, and two third slots each having a third area smaller than the second area of each of the second slots. A first area of each of the first slots is greater than a second area of each of the second slots, the first section and the at least one second section meet at two locations, and each of two third slots is located at one of the two locations. A circumferential manifold is located outwardly of the inner case wall including an environmental control system port. At least one of the plurality of second slots is located proximate to the environmental control system port.

In a further embodiment of any of the foregoing compressors the second area of each of the second slots is substantially 90% of the first area of each of the first slots, and the third area of each of the third slots is substantially 95% of the first area of each of the first slots.

In a further embodiment of any of the foregoing compressors the manifold includes four mid-turbine frame/low pressure turbine ports that direct bleed air to a mid-turbine frame and a low pressure turbine, and a buffer port that directs bleed air to bearings. The first slots are located proximate to the four mid-turbine frame/low pressure turbine ports and at least one of the two third slots are located proximate to the buffer port.

In a further embodiment of any of the foregoing compressors the plurality of first slots, the plurality of second slots, and the two third slots are equally located about the central longitudinal axis.

In a further embodiment of any of the foregoing compressors the compressor is a high pressure compressor.

In a further embodiment of any of the foregoing compressors the plurality of second slots are located proximate to the port.

These and other features of the present invention can be best understood from the following specification and drawings, the following of which is a brief description.

DETAILED DESCRIPTION OF THE PREFERRED EMBODIMENT

Figure 1:
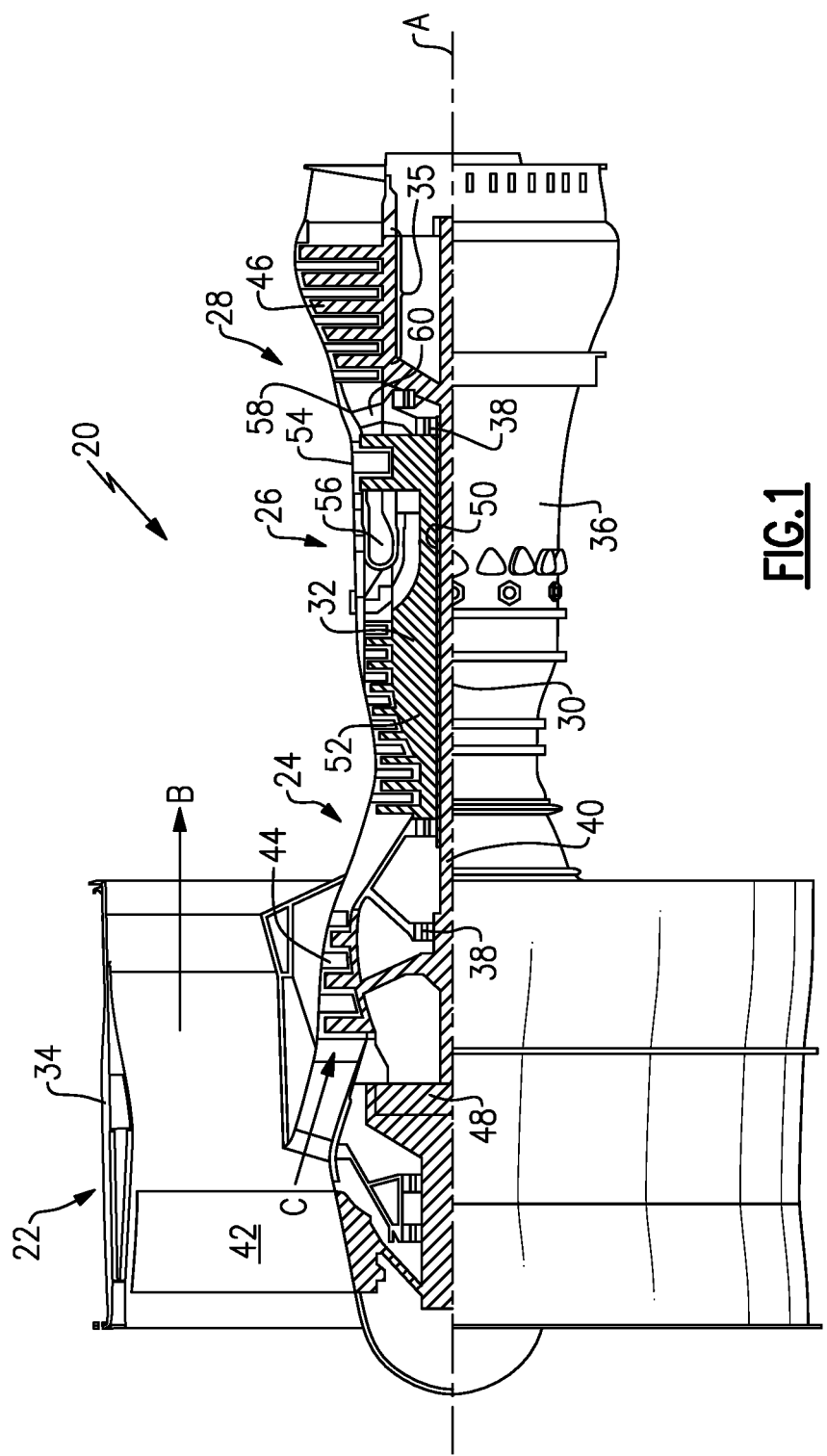
FIG. 1 illustrates a schematic view of an embodiment of a gas turbine engine.

FIG. 1 schematically illustrates an example gas turbine engine 20, such as a geared turbofan engine, that includes a fan section 22, a compressor section 24, a combustor section 26 and a turbine section 28. Alternative engines might include an augmenter section (not shown) among other systems or features. The fan section 22 includes a fan 42 and drives air along a bypass flow path B in a bypass duct defined within a nacelle 34, while the compressor section 24 draws air in along a core flow path C where air is compressed and communicated to the combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a geared turbofan gas turbine engine, it should be understood that the concepts described herein are not limited to use with geared turbofans as the teachings may be applied to other types of traditional turbine engines. For example, the gas turbine engine 20 can have a three-spool architecture in which three spools concentrically rotate about a common axis and where a low spool enables a low pressure turbine to drive the fan 42 via a gearbox, an intermediate spool that enables an intermediate pressure turbine to drive a first compressor of the compressor section, and a high spool that enables a high pressure turbine to drive a high pressure compressor of the compressor section.

The example gas turbine engine 20 generally includes a low speed spool 30 and a high speed spool 32 mounted for rotation about a central longitudinal axis A relative to an engine static structure 36 via several bearing systems 38. It should be understood that various bearing systems 38 at various locations may alternatively or additionally be provided.

The low speed spool 30 generally includes an inner shaft 40 that connects the fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the central longitudinal axis A which is collinear with their longitudinal axes.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than substantially 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The air in the core flow path C is compressed by the low pressure compressor 44 then by the high pressure compressor 52, mixed with fuel and ignited in the combustor 56 to produce high speed exhaust gases that are then expanded through the high pressure turbine 54 and low pressure turbine 46. The mid-turbine frame 58 includes vanes 60, which are in the core flow path C and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than substantially six (6), with an example embodiment being greater than substantially ten (10). The example geared architecture 48 is an epicyclical gear train, such as a planetary gear system, star gear system or other known gear system, with a gear reduction ratio of greater than substantially 2.3.

In one disclosed embodiment, the gas turbine engine 20 includes a bypass ratio greater than substantially ten (10:1) and the fan diameter is significantly larger than an outer diameter of the low pressure compressor 44. It should be understood, however, that the above parameters are only exemplary of one embodiment of a gas turbine engine including a geared architecture 48 and that the present disclosure is applicable to other gas turbine engines.

A significant amount of thrust is provided by the air in the bypass flow path B due to the high bypass ratio. The fan section 22 of the gas engine 20 is designed for a particular flight condition—typically cruise at substantially 0.8 Mach and substantially 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than substantially 1.50. In another non-limiting embodiment the low fan pressure ratio is less than substantially 1.45. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150 ft/second.

The example gas turbine engine includes the fan 42 that comprises in one non-limiting embodiment less than substantially 26 fan blades. In another non-limiting embodiment, the fan section 22 includes less than substantially 20 fan blades. Moreover, in one disclosed embodiment the low pressure turbine 46 includes no more than substantially 6 turbine rotors. In another non-limiting example embodiment the low pressure turbine 46 includes substantially 3 turbine rotors. A ratio between the number of fan blades and the number of low pressure turbine rotors is between substantially 3.3 and substantially 8.6. The example low pressure turbine 46 provides the driving power to rotate the fan section 22 and therefore the relationship between the number of turbine rotors in the low pressure turbine 46 and the number of blades in the fan section 22 disclose an example gas turbine engine 20 with increased power transfer efficiency.

Figure 2:
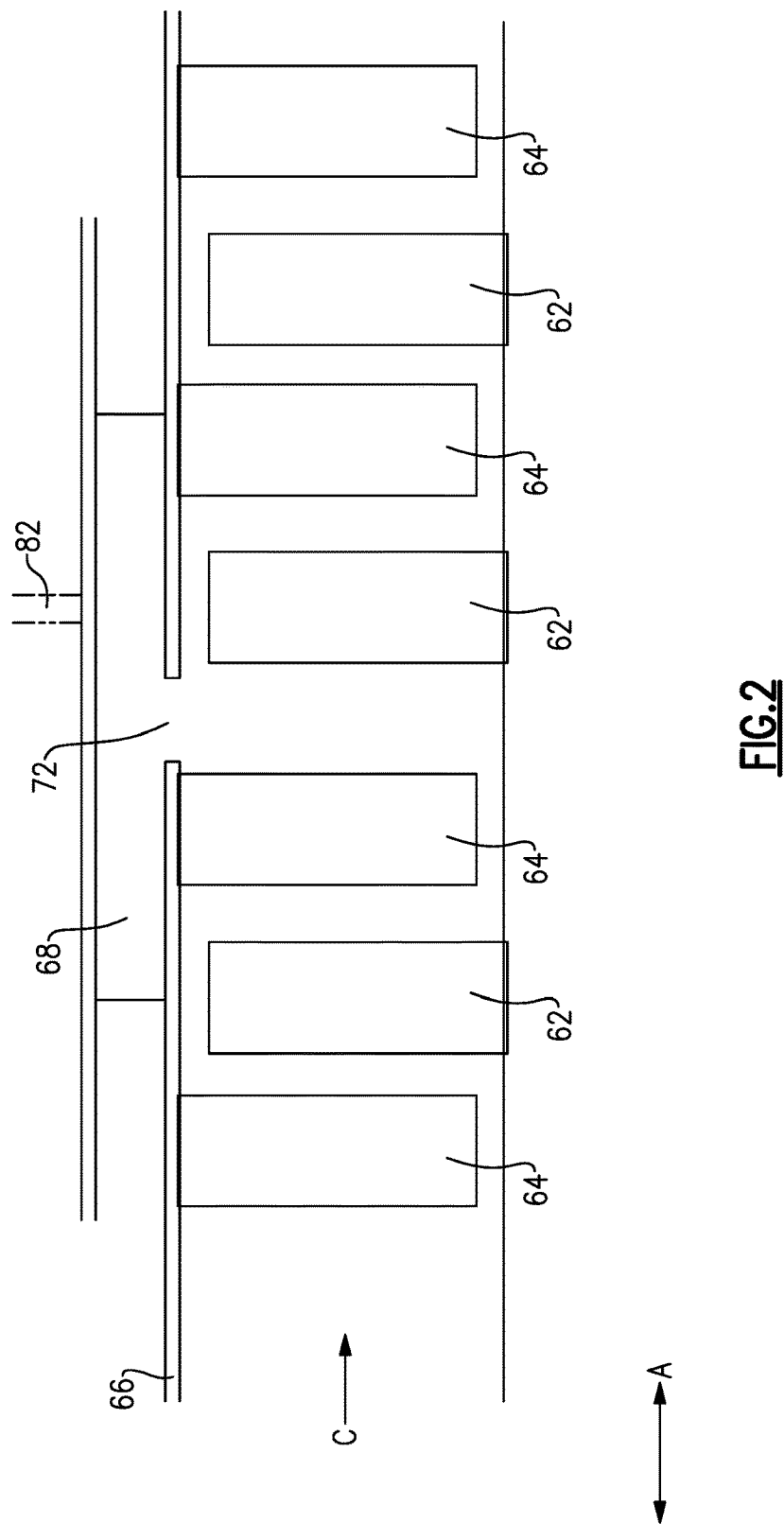
FIG. 2 illustrates a cross-sectional view of an axial compressor taken along a central longitudinal axis.

FIG. 2 illustrates a cross-sectional view of a portion of an axial compressor, such as the high pressure compressor 52, of the gas turbine engine 20. The high pressure compressor 52 includes a plurality of rotors 62 that rotate about the central longitudinal axis A and a plurality of stators 64 attached to a circumferential inner case 66 located outwardly of the plurality of rotors 62 and the plurality of stators 64. The plurality of rotors 62 and the plurality of stators 64 alternate. A circumferential manifold 68 is located outwardly of the inner case 66. Air flows through ports 78, 80 and 82 in the manifold 68 to various gas turbine engine 20 components, as explained below.

Figure 3:
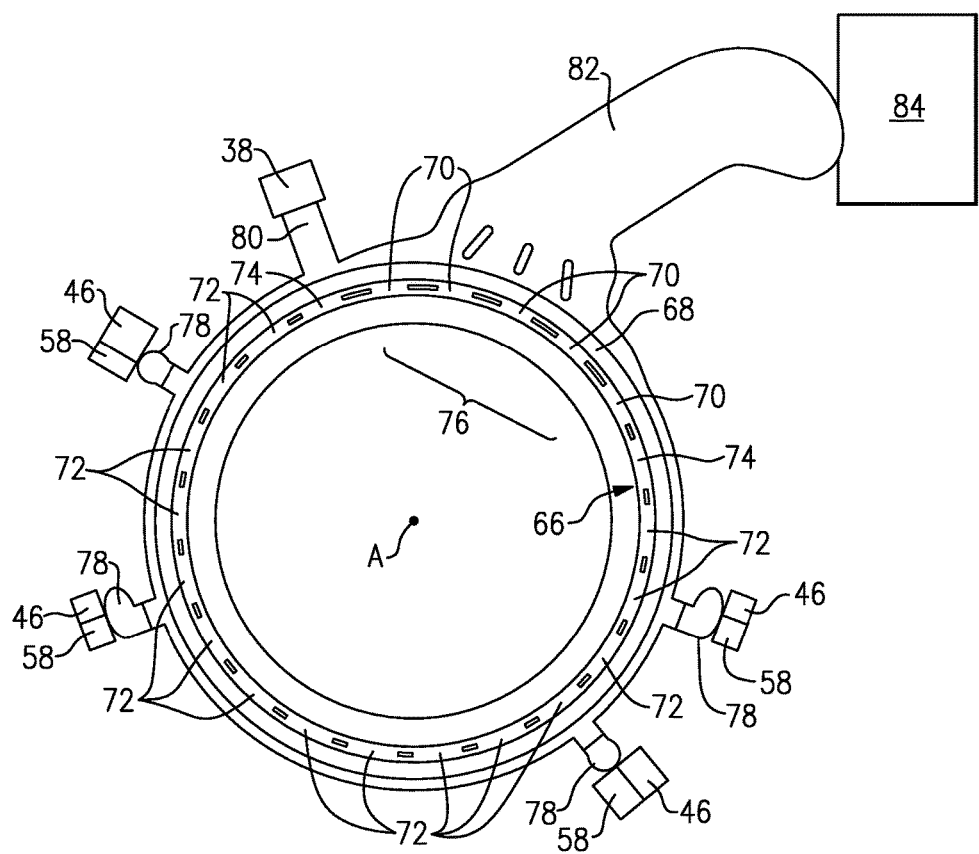
FIG. 3 illustrates a cross-sectional view of the axial compressor taken along an axis perpendicular to the central longitudinal axis.

As shown in FIG. 3, the inner case 66 includes a plurality of smaller bleed slots 70, a plurality of transitional bleed slots 74, and a plurality of larger bleed slots 72 in fluid communication with the manifold 68. As shown in FIG. 3, at least a portion of each of the smaller bleed slots 70, transitional bleed slots 74, and larger bleed slots 72 are axially aligned with respect to the central longitudinal axis A. The smaller bleed slots 70, the transitional bleed slots 74, and the larger bleed slots 72 are separated by structural ligaments. Air from the core flow path C flows through the smaller bleed slots 70, the transitional bleed slots 74, and the larger bleed slots 72 and into the manifold 68. In one example, the smaller bleed slots 70, the transitional bleed slots 74, and the larger bleed slots 72 are located axially after the fourth stage rotor 62.

The plurality of smaller bleed slots 70 are grouped together in a common area 76 of the inner case 66, and one transitional bleed slot 74 is located on each side of the common area 76. In one example, there are five smaller bleed slots 70, two transitional bleed slots 74 and fifteen larger bleed slots 72. In one example, the smaller bleed slots 70, the transitional bleed slots 74, and the larger bleed slots 72 are equally spaced about the central longitudinal axis A.

In one example, the smaller bleed slots 70, the transitional bleed slots 74, and the larger bleed slots 72 are substantially oval in shape. In one example, the smaller bleed slots 70 each have an area that is substantially 90% of the area of each of the larger bleed slots 72. In one example, the transitional bleed slots 74 each have an area that is substantially 95% of the area of each of the larger bleed slots 72. That is, the smaller bleed slots 70, the transitional bleed slots 74, and the larger bleed slots 72 have unequal areas. Therefore, the distribution of bleed slots 70, 72 and 74 is non-axis-symmetric.

The manifold 68 includes six ports. The manifold 68 includes four mid-turbine frame/low pressure turbine ports 78 that direct bleed air in the manifold 68 to the mid-turbine frame 58 and the low pressure turbine 46. The larger bleed slots 72 are located proximate to the mid-turbine frame/low pressure turbine ports 78. In one example, at least one of the larger bleed slots 72 is located proximate to the mid-turbine frame/low pressure turbine port 78.

The manifold 68 also includes a buffer port 80 that directs bleed air in the manifold 68 to the bearing systems 38. The buffer port 80 is located near one of the two transitional bleed slots 74.

The manifold 68 also includes an environmental control system port 82 located near the smaller bleed slots 70 that directs air to an environmental control system 84. The greatest amount of bleed air flows through the environmental control system port 82. The environmental control system port 82 has an opening with an area that is approximately four to six times larger than the area of the opening of the mid-turbine frame/low pressure turbine ports 78 or the area of the opening of the buffer port 80.

By locating the smaller bleed slots 70 proximate to the environmental control system port 82, a reduced amount of air flows into the environmental control system port 82 through the smaller bleed slots 70. However, as the manifold 68 is circumferential, bleed air from the other larger bleed slots 72 flows towards and enters the environmental control system port 82, allowing the required amount of bleed air to be directed to the environmental control system 84. That is, the environmental control system 84 is provided with enough bleed air because of the other bleed air flowing into the manifold 68 through the slots 72 proximate to the mid-turbine frame/low pressure turbine ports 78 and the buffer port 80.

Pressure losses from the low pressure compressor 24 to the manifold 68 are reduced due to the presence of the larger bleed slots 72. As a result of the distribution of bleed slots 70, 72 and 74 of different areas, the flow of bleed air becomes more axis-symmetric.

Additionally, each of the smaller bleed slots 70 can have a different area than the other smaller bleed slots 70, each of the transitional bleed slots 74 can have a different area than the other of the transitional bleed slot 74, and each of the larger bleed slots 72 can have a different area than the other of the larger bleed slots 72. That is, the area of each of the smaller bleed slots 70 does not need to be identical, the area of each of the transitional bleed slots 74 does not need to be identical, and the area of each of the larger bleed slots 72 does not need to be identical.

In another example, the smaller bleed slots 70 are located in two spaced apart regions separated by at least one transitional bleed slot 74 or larger bleed slot 72. In this example, a transitional bleed slot 74 or a larger bleed slot 72 can be located between two common area 76 that each include smaller bleed slots 70.

Although a gas turbine engine 20 with geared architecture 48 is described, the inner case 66 can be employed in a gas turbine engine without geared architecture.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A compressor of a gas turbine engine comprising:
   a plurality of rotors rotatable about a central longitudinal axis;
   a plurality of stators;
   a circumferential inner case wall located outwardly of the plurality of rotors and the plurality of stators, the inner case wall including a plurality of first slots that are adjacent and are located in a first section of the circumferential inner case wall and a plurality of second slots that are adjacent and are located in a second section of the circumferential inner case wall, wherein an area of each of the plurality of first slots is greater than an area of each of the plurality of second slots, and wherein at least a portion of each first and second slot is axially aligned with respect to the central longitudinal axis; and
   a circumferential manifold located outwardly of the inner case wall and including a plurality of first ports and an environmental control system port, wherein the environmental control system port directs bleed air to an environmental control system and has a greater amount of bleed airflow than the plurality of first ports, and wherein each of the plurality of second slots is closer than each of the plurality of first slots to the environmental control system port.

2. The compressor as recited in claim 1 wherein the compressor is a low pressure compressor.

3. The compressor as recited in claim 1 wherein the plurality of first slots and the plurality of second slots are located after a fourth stage rotor.

4. The compressor as recited in claim 1 wherein the area of each of the plurality of second slots is about 90% of the area of each of the plurality of first slots.

5. The compressor as recited in claim 1 wherein the plurality of first ports comprises four mid-turbine frame/low pressure turbine ports that direct bleed air to a mid-turbine frame and a low pressure turbine.

6. The compressor as recited in claim 5 wherein each of the plurality of first slots are located closer than each of the plurality of second slots to the four mid-turbine frame/low pressure turbine ports.

7. The compressor as recited in claim 1 wherein the circumferential manifold includes a buffer port that directs bleed air to bearings and is situated between the environmental control system port and one of the plurality of first ports.

8. The compressor as recited in claim 1 including two third slots, wherein each of the two third slots have an area smaller than the area of each of the plurality of first slots and larger than the area of each of the plurality of second slots, and the first section and the second section meet at two locations, and each of third slots is located at one of the two locations.

9. The compressor as recited in claim 8 wherein the area of each of the two third slots is about 95% of the area of each of the plurality of first slots.

10. The compressor as recited in claim 8 wherein the plurality of first slots, the plurality of second slots, and the two third slots are equally spaced about the central longitudinal axis.

11. The compressor as recited in claim 8 comprising a buffer port that is separate from the plurality of first ports and the environmental control system port, wherein at least one of the two third slots is located closer to the buffer port than each of the plurality of first slots and each of the plurality of second slots.

12. The compressor as recited in claim 1:
   wherein the plurality of first ports comprises four mid-turbine frame/low pressure turbine ports that direct bleed air to a mid-turbine frame and a low pressure turbine,
   wherein the circumferential manifold includes a buffer port that directs bleed air to bearings, and
   wherein the environmental control system port has an area that is about four to about six times larger than an area of each of the four mid-turbine frame/low pressure turbine ports and an area of the buffer port.

13. A compressor of a gas turbine engine comprising:
   a plurality of rotors rotatable about a central longitudinal axis;
   a plurality of stators;
   a circumferential inner case wall located outwardly of the plurality of rotors and the plurality of stators, the circumferential inner case wall including:
      a plurality of first slots that are adjacent and each have an area and are located in a first section of the circumferential inner case wall,
      a plurality of second slots that are adjacent and each have an area and are located in a second section of the circumferential inner case wall, and
      two third slots each having an area larger than the area of each of the plurality of second slots,
      wherein the area of each of the plurality of first slots is greater than the area of each of the plurality of second slots and the area of each of the two third slots, the first section and the second section meet at two locations, and each of the two third slots is located at one of the two locations, and wherein at least a portion of each first, second, and third slot is axially aligned with respect to the central longitudinal axis; and
   a circumferential manifold located outwardly of the circumferential inner case wall including an environmental control system port, wherein each of the plurality of second slots is located closer than each of the plurality of first slots to the environmental control system port.

14. The compressor as recited in claim 13 wherein the area of each of the plurality of second slots is about 90% of the area of each of the plurality of first slots, and the area of each of the two third slots is about 95% of the area of each of the plurality of first slots.

15. The compressor as recited in claim 13 wherein:
   the circumferential manifold includes:
   four mid-turbine frame/low pressure turbine ports that direct bleed air to a mid-turbine frame and a low pressure turbine, and
   a buffer port that directs bleed air to bearings,
   wherein each of the plurality of first slots are located closer than each of the plurality of second slots and the two third slots to the four mid-turbine frame/low pressure turbine ports, and the two third slots are located closer than each of the plurality of first slots and each of the plurality of second slots to the buffer port.

16. The compressor as recited in claim 13 wherein the plurality of first slots, the plurality of second slots, and the two third slots are equally spaced about the central longitudinal axis.

17. The compressor as recited in claim 16 wherein the compressor is a low pressure compressor.

18. The compressor as recited in claim 15, wherein the environmental control system port has a greater amount of airflow than the mid-turbine frame/low pressure turbine ports and the buffer port.

\* \* \* \* \*